United States Patent

Baranova et al.

[11] 3,960,682
[45] June 1, 1976

[54] METHOD OF PROCESSING WASTE GASES CONTAINING SULPHUROUS-ACID ANHYDRIDE

[75] Inventors: Rimma Bronislavovna Baranova; Vladimir Ilich Lazarev; Nikolai Petrovich Mironov; Viktor Alexandrovich Pinaev; Lenar Timofeevich Bugaenko; Evgeny Petrovich Kalyazin; Alexandra Timofeevna Panferova; Vsevolod Mikhailovich Byakov; Jury Nikolaevich Nikeshichev, all of Moscow; Petrovich Evgeny Petryaev, Minsk, all of U.S.S.R.

[73] Assignees: Jury Nikolaevick Nikeshichev; Evgeny Petrovich Petryoev, 2, U.S.S.R.

[22] Filed: Sept. 6, 1974

[21] Appl. No.: 503,952

[52] U.S. Cl. .................................. 204/157.1 H
[51] Int. Cl.[2] .................................. B01J 1/10
[58] Field of Search ........................ 204/157.1 H

[56] References Cited
FOREIGN PATENTS OR APPLICATIONS
265,857  2/1927  United Kingdom.......... 204/157.1 H

*Primary Examiner*—Howard S. Williams
*Attorney, Agent, or Firm*—Fleit & Jacobson

[57] ABSTRACT

A method of processing waste gases containing sulphurous-acid anhydride comprises contacting said waste gases with an aqueous solution of sulphuric acid in the presence of oxygen or air and a catalyst comprising an inorganic manganese salt, such as manganese sulphate, perchlorate, chloride, nitrate or phosphate used in an amount of 0.0003–0.03 wt.% based on manganese ion to obtain an aqueous solution of sulphuric acid containing sulphurous-acid anhydride. This solution is subjected to the action of an agent for initiating the oxidation of sulphurous-acid anhydride comprising ionizing radiation to obtain an aqueous solution of sulphuric acid free from sulphurous-acid anhydride. A part of the sulphuric acid is derived from the cycle in the form of the resulting aqueous solution in an amount equivalent to the amount of the oxidized sulphurous-acid anhydride, and the remaining part of the sulphuric acid is fed for contacting with the waste gases.

The method permits the processing of waste gases containing up to 0.4 vol.% of sulphurous-acid anhydride using a simple production technique with a high degree of purification, as well as obtaining commercial sulphuric acid with a concentration up to 50%.

13 Claims, 1 Drawing Figure

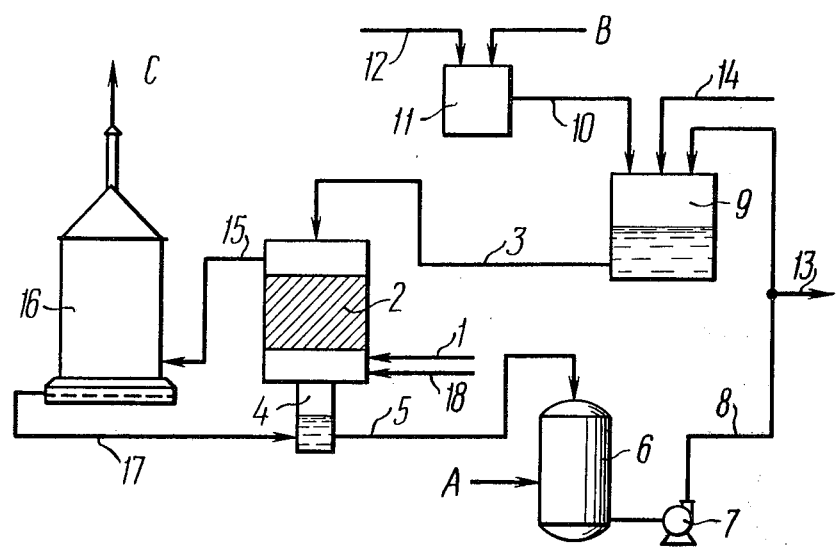

METHOD OF PROCESSING WASTE GASES CONTAINING SULPHUROUS-ACID ANHYDRIDE

The present invention relates to methods of processing waste gases containing sulphurous-acid anhydride.

Known in the art are a number of methods of processing waste gases containing sulphurous-acid anhydride, such as waste gases from sulphuric-acid industries, low-contaminated waste gases from thermal power plants, waste gases from the production of elementary sulphur from hydrogen sulphide and from some other industries. The overwhelming majority of these methods are based on the sorption of sulphurous-acid anhydride with a neutralizing alkaline solution with the formation of intermediate products which are subjected to further treatment.

Thus, widely known in the art is the ammonia method of processing waste gases, wherein sulphurous-acid anhydride of waste gases from sulphuric-acid industries is reacted with an ammonia solution to obtain sulphite-bisulphite solutions. These solutions are subjected to decomposition with acid solutions and are then processed to obtain fertilizers. Sulphur dioxide released during the decomposition of the sulphite-bisulphite solutions is returned back to the sulphuric acid production cycle.

The main disadvantage of the ammonia method of processing consists in the use of decomposition stages and the steps or processing sulphite-bisulphite solutions derived from the sorption cycle, so that the production technique of the process becomes complicated and results in additional expenses. Another disadvantage of the ammonia method of processing consists in that the products resulting from such a processing are not always demanded on the market.

It is also known to process waste gases from sulphuric-acid industries on the basis of the catalytic oxidation of sulphurous-acid anhydride contained in these gases with oxygen, which is also available in these gases, in an aqueous solution of sulphuric acid.

Thus, known in the art is an acidic-catalytic method of processing comprising the step of sorption of sulphur dioxide with a diluted aqueous solution of sulphuric acid in the presence of a catalyst comprising pyrolusite having a sufficiently high concentration.

The degree of purification and recovery of sulphurous-acid anhydride by this method does not exceed 0.75–0.85 so that even with the use of high-grade pyrolusite the concentration of sulphuric acid derived from the sorption cycle is below 25%. The use of such diluted sulphuric acid in the main sulphuric acid production cycle is not always possible so that an additional concentration thereof with oleum is required.

Known in the art is also an ozone-catalytic method of processing waste gases from sulphuric-acid industries. This method essentially consists in that waste gases containing sulphurous-acid anhydride and oxygen are contacted, after the cooling, with an aqueous solution of sulphuric acid in the presence of a catalyst which comprises manganese sulphate. The process is conducted under the action of the oxidation initiating agent ozone, whereby sulphurous-acid anhydride is oxidized with oxygen in the liquid phase into sulphuric acid.

By this method a two-stage cyclical processing technique is employed.

Gas containing up to 6% of oxygen, up to 0.2 vol.% of $SO_2$ and about 0.005 vol.% of ozone is consequently passed through two packed absorbers sprayed with an aqueous solution of sulphuric acid supplied in counterflow with the gas. This aqueous solution of sulphuric acid contains oxygen and a catalyst — manganese sulphate - in an amount of 0.03 vol.% based on manganese ion which are preliminarily dissolved in sulphuric acid. Upon contacting the gas being processed and the aqueous solution of sulphuric acid, an aqueous solution of sulphuric acid containing sulphurous-acid anhydride is obtained. The amount of the dissolved oxygen is specified on the basis of its content in the starting gas being processed which is of the order of 20 vol.%. The process is conducted at 20°–30°C. Under the action of ozone free radicals are formed in the aqueous solution of sulphuric acid. These radicals, in the presence of the catalyst, initiate the oxidation of sulphurous-acid anhydride with oxygen in accordance with the chain-reaction mechanism. An aqueous solution of sulphuric acid with a concentration of 25–40% is fed for spraying into the first absorber. The amount of sulphuric acid derived from the sorption cycle is equivalent to the amount of sulphurous-acid anhydride oxidized during the same period. The concentration of the spraying aqueous solution of sulphuric acid in the second absorber is 5–15%. By this method the degree of gas purification is 0.95. The cost of the purification of waste gases is rather high due to the employment of ozone. With almost complete oxidation of sulphurous-acid anhydride into sulphuric acid the degree of utilization of ozone does not exceed 60–70%, this value decreasing with an increase in the concentration of the spraying sulphuric acid in the first absorber from 30 to 40% and with a temperature raise above 20°C.

Therefore, the main disadvantages of the above-described method are the following: sulphuric acid having a concentration greater than 40% cannot be obtained with a sufficient degree of utilization of ozone; the technological process cannot be conducted at a temperature above 30°C; and high power consumption of ozonizers and complicated operation and maintenance thereof.

It is an object of the present invention to provide a method of processing waste gases containing sulphurous-acid anhydride which permits obtaining a higher degree of recovery of sulphurous-acid anhydride from waste gases with a greater concentration of sulphuric acid obtained during the processing.

Another object of the present invention is to provide a method allowing the elimination of the precooling of waste gases fed for processing.

With these and other objects in view, the invention consists in contacting waste gases with an aqueous solution of sulphuric acid in the presence of oxygen or air and a catalyst, the catalyst comprising an inorganic manganese salt, such as manganese sulphate, perchlorate, chloride, nitrate or phosphate in an amount of 0.0003–0.03 wt.% based on manganese ion to obtain an aqueous solution of sulphuric acid containing sulphurous-acid anhydride, subjecting the resulting solution to the action of an agent for initiating the oxidation of sulphurous-acid anhydride comprising ionizing radiation to obtain an aqueous solution of sulphuric acid free from sulphurous-acid anhydride, with subsequent derivation from the cycle of a part of the sulphuric acid in an form of the resulting aqueous solution in the amount equivalent to the amount of oxidized sulphurous-acid anhydride, and the remaining part of the aqueous solution of sulphuric acid is fed for contacting with the waste gases.

As was mentioned above, a part of the resulting aqueous solution of sulphuric acid is derived from the cycle, and the remaining part is fed for contacting with the waste gases. If the content of the catalyst in this remaining part of the sulphuric acid solution is insufficient, this part of the solution is preferably mixed with an aqueous solution of the catalyst prior to contacting. In contacting the gas and liquid phases the absorption of sulphurous-acid anhydride of the waste gases with an aqueous solution of sulphuric acid takes place. At the same time, during the above-mentioned contacting step, sulphurous-acid anhydride is oxidized due to the presence of active particles and free radicals which are the products of radiolysis of water and sulphuric acid. The above-mentioned products of radiolysis are formed under the action of the ionizing radiation in the aqueous solution of sulphuric acid.

With the oxygen available in the waste gases, the absorbtion of oxygen also takes place when contacting the gas and liquid phases.

The products of radiolysis of water and sulphuric acid, in the presence of oxygen and catalyst, initiate the oxidation of sulphurous-acid anhydride in accordance with the chain-reaction mechanism with the formation of an aqueous solution of sulphuric acid containing the catalyst and free of sulphurous-acid anhydride. The degree of oxidation of sulphurous-acid anhydride depends on the process conditions: the concentration of sulphurous-acid anhydride in the waste gas, the temperature of the waste gas, the concentration of the spraying acid and the sulphurous-acid anhydride/oxygen ratio.

Waste gases from some industries, such as from the sulphuric acid industries contain oxygen in an amount which is insufficient for complete oxidation of sulphurous-acid anhydride. In such cases the shortage of oxygen is preferably compensated for by supplying an additional quantity of oxygen or air.

Considering an optimum ratio between sulphurous-acid anhydride and oxygen, and on the basis of specified process parameters, the additional quantity of oxygen or air to be introduced may be calculated. The additional quantity of oxygen or air required may be introduced, e.g. prior to contacting the waste gas with the aqueous solution of sulphuric acid by preliminarily mixing the waste gas with oxygen or air. The shortage of oxygen may be compensated for also during the contacting of the waste gases with the aqueous solution of sulphuric acid with concurrent feeding of oxygen or air to the contacting stage, or during the action of the ionizing radiation on the aqueous solution of sulphuric acid containing sulphurous-acid anhydride with concurrent feeding of oxygen or air into said solution. The amount of oxygen or air required may be compensated for by using various combinations of the above-described techniques.

The method according to the invention permits obtaining commercial sulphuric acid having a concentration up to 50% with a low rating of radiation sources (of the order of 2–70 rad/s) with the guarantee of the sanitary purification of the gases (degree of purification better than 0.95). The radiation-chemical yield of the oxidation of sulphurous-acid anhydride into sulphuric acid $G(-SO_2)$ is up to 4000 molecules per 100 eV of the absorbed radiation power.

The method of processing waste gases from sulphuric-acid industries with the employment of the ionizing radiation is economically advantageous as compared to known methods which are being used at present.

The method according to the invention will now be described in greater detail with reference to a preferred embodiment thereof illustrated in the accompanying drawing showing a diagrammatic view of the production installation.

As shown in the drawing, gas containing sulphurous-acid anhydride is fed through a pipe 1 into the bottom portion of a packed absorber 2. The top portion of the absorber 2 is supplied through a pipe 3 with a preliminarily irradiated aqueous solution of sulphuric acid containing a catalyst for spraying the packing. An aqueous solution of sulphuric acid containing dissolved sulphurous-acid anhydride and oxygen flows down from the absorber 2 into an acid collector 4, wherefrom it is fed through a pipe 5 into a radiation-chemical apparatus 6. In the radiation-chamical apparatus this solution is subjected to the action of an ionizing radiation with the direction of the rays conventionally indicated by an arrow A. As a result of this ionizing action of the radiation in the presence of oxygen, sulphurous-acid anhydride is oxidized into sulphuric acid. The source of the ionizing radiation may comprise an X-ray source, a γ-source using radioactive isotopes, such as $Co^{60}$, $Cs^{137}$, as well as the braking radiation from a charged-particle accelerator. The irradiated aqueous solution of sulphuric acid containing active particles and free radicals is pumped from the radiation-chemical apparatus 6 by means of a pump 7 through a pipe 8 into a pressure tank 9. The same tank 9 is supplied with an aqueous solution of a catalyst prepared in a tank 11 and fed through a pipe 10. The preparation of this catalyst solution is made in the tank 11 by mixing water fed through a pipe 12 and a manganese salt which is fed as shown by an arrow B. The resulting aqueous solution of sulphuric acid containing the catalyst is fed from the tank 9 through the pipe 3 for spraying into the absorber 2. A part of the irradiated solution of sulphuric acid pumped by the pump 7 is derived through a pipe 13 from the cycle as the final product, the amount of sulphuric acid in the form of an aqueous solution thereof taken-off per unit of time being equivalent to the amount of sulphurous-acid anhydride oxidized during the same period. The consumption of sulphuric acid and catalyst is compensated for by the addition into the pressure tank 9 of a required quantity of water supplied through a pipe 14 and the catalyst solution supplied from the tank 11. The purified gas is taken-off from the top portion of the absorber 2 and is fed through a pipe 15 into a splash separator 16, whereafter it is exhausted into the atmosphere as shown by an arrow C. Sulphuric acid separated in the splash separator 16 is fed through a pipe 17 into the acid collector 4.

In the case of a shortage of oxygen in the system, it is compensated for by supplying air or oxygen through a pipe 18 into the bottom portion of the absorber 2.

However, as it was mentioned above, the shortage of oxygen in the system may be also compensated for by preliminarily mixing the waste gases with oxygen or air before feeding them into the absorber, or by feeding oxygen or air into the radiation-chemical apparatus. The shortage of oxygen may also be compensated for by combining these techniques.

The invention will be better understood from the following specific examples.

Example 1

Gas containing 0.13 vol.% of $SO_2$ and 8 vol.% of $O_2$ at 70°C was fed into an absorber sprayed with a preliminarily irradiated 40% aqueous solution of sulphuric acid containing manganese sulphate as catalyst in an amount of 0.03 wt % based on manganese ion. The absorbed dosage rate in irradiating the solution with X-rays was 1.1 rad/s. The content of sulphurous-acid anhydride in the gas leaving the absorber was 0.0013 vol%. The degree of purification $\alpha=0.995$. The radiation-chemical yield of oxidation of sulphurous-acid anhydride $G(-SO_2)$ was 2200 molecules per 100 eV.

Example 2

Gas containing 0.13 vol.% of $SO_2$ and 7.5 vol.% of $O_2$ at 50°C was fed into an absorber sprayed with 50% aqueous solution of sulphuric acid preliminarily irradiated with X-rays and containing manganese sulphate as catalyst in an amount of 0.03 wt.% based on manganese ion and iron sulphate (as a result of the equipment corrosion) in an amount of 0.0034 wt.% based on iron ion. The absorbed dosage rate was 2.5 rad/s. The content of sulphurous-acid anhydride in the gas leaving the absorber was 0.0012 vol.%. The degree of purification $\alpha = 0.96$. The radiation-chemical yield of the oxidation $G(-SO_2) = 1000$ molecules per 100 eV.

Example 3

Gas containing 0.17 vol.% of $SO_2$, 7.5 vol.% of $O_2$ and $1.10^{-6}$ vol.% of phenol at 70°C was fed into an absorber sprayed with 40% aqueous solution of sulphuric acid preliminarily irradiated with γ-rays from $Co^{60}$ and containing manganese sulphate as catalyst in an amount of 0.03 wt.% based on manganese ion. The absorbed dosage rate was 1.2 rad/s. The content of $SO_2$ in the gas leaving the absorber was 0.0016 vol.%. The degree of purification $\alpha=0.92$. The radiation-chemical yield of the oxidation $G(-SO_2) =2700$ molecules per 100 eV.

Example 4

Gas containing 1.4 vol.% of $SO_2$ and 8 vol.% of $O_2$ at 600°C was mixed with air at 20°C in a pipe before the absorber with the gas air ratio of 1:9 and was then fed at about 60°C into the absorber sprayed with 40% aqueous solution of sulphuric acid irradiated with γ-rays from $Co^{60}$ and containing manganese nitrate as catalyst in an amount of 0.0003 wt.% based on manganese ion. The absorbed dosage rate was 1.2 rad/s. The gas leaving the absorber contained 0.0014 vol.% of $SO_2$. The degree of purification $\alpha=0.995$. The radiation-chemical yield of oxidation $G(-SO_2) =2400$ molecules per 100 eV.

Example 5

Gas containing 0.8 vol.% of $SO_2$ and 6 vol.% of $O_2$ at 90°C was fed into an absorber. Air at 20°C in an amount of 3 vol.parts per 1 vol.part of the gas was fed into the same absorber. The temperature of the gas mixture was about 25°C. The absorber was sprayed with 50% aqueous solution of sulphuric acid irradiated with γ-rays and containing manganese chloride as catalyst in an amount of 0.003 wt.% based on manganese ion. The absorbed dosage rate was 2.5 rad/s, the content of sulphurous-acid anhydride in the gas leaving the absorber was 0.0018 vol.%. The degree of purification $\alpha=0.92$. The radiation-chemical yield $G(-SO_2)= 1500$ molecules per 100 eV.

Example 6

Gas containing 0.8 vol.% of $SO_2$ and 5 vol.% of $O_2$ was fed at 70°C into an absorber sprayed with 40% aqueous solution of sulphuric acid irradiated with γ-rays and containing manganese phosphate as catalyst in an amount of 0.003 wt.% based on manganese ion. At the same time, air was fed into the bottom portion of the absorber at 20°C in an amount of 1 vol.part per 1 vol.part of the gas. Air was also fed into the radiation-chemical apparatus in an amount of 1 vol.part per 1 vol.part of the gas being purified. The absorbed dosage rate was 1.2 rad/s. The content of sulphurous-acid anhydride in the gas leaving the absorber was 0.0038 vol.%. The degree of purification $\alpha=0.94$. The radiation-chemical yield $G(-SO_2)=6450$ molecules per 100 eV.

Example 7

Gas containing 0.39 vol.% of $SO_2$ and 10 vol.% of $O_2$ at 70°C was mixed with air at 20°C with the volumetric ratio 1:1 before feeding into an absorber and was then fed into the absorber. The spraying was made with 50% solution of sulphuric acid irradiated with γ-rays and containing manganese perchlorate as catalyst in an amount of 0.03 wt.% based on manganese ion. Oxygen in an amount of 1 vol.part per 5 vol.parts of the gas being purified was fed into a radiation-chemical apparatus. The content of sulphurous-acid anhydride in the purified gas was 0.0019 vol.%. The degree of purification $\alpha=0.97$. The absorbed dosage rate was 10 rad/s. The radiation-chemical yield $G(-SO_2)=400$ molecules per 100 eV.

Example 8

Gas containing 0.3 vol.% of $SO_2$ and 8 vol.% of $O_2$ at 70°C was fed into an absorber sprayed with 40% aqueous solution of sulphuric acid irradiated with γ-rays and containing manganese phosphate as catalyst in an amount of 0.0003 wt.% based on manganese ion. Oxygen was fed into a radiation-chemical apparatus in an amount of 1 vol.part per 5 vol.parts of the gas being purified. The absorbed dosage rate was 2.5 rad/s. The content of sulphurous-acid anhydride at the output of the absorber was 0.0029 vol.%. The degree of purification $\alpha=0.98$. The radiation-chemical yield $G(-SO_2) =5000$ molecules per 100eV.

Example 9

Gas containing 0.2 vol.% of $SO_2$ and 20 vol.% of $O_2$ was fed at 20°C into an absorber sprayed with 40% aqueous solution of sulphuric acid irradiated with X-rays and containing manganese sulphate as catalyst in an amount of 0.0003 wt.% based on manganese ion. The absorbed dosage rate was 1.1 rad/s. The content of sulphurous-acid anhydride at the output of the absorber was nil. The degree of purification $\alpha=1.0$. The radiation-chemical yield of the oxidation $G(-SO_2)$ was more than 3400 molecules per 100 eV.

Example 10

Gas containing 0.230 vol.% of $SO_2$ and 20 vol.% of $O_2$ at 20°C was fed into an absorber.

Prior to the feeding for spraying, 40% aqueous solution of sulphuric acid irradiated with γ-rays and containing manganese nitrate as catalyst in an amount of 0.00028 wt.% based on manganese ion was mixed with 10% aqeuous solution of manganese nitrate to obtain 40% aqueous solution containing 0.03 wt.% of the catalyst based on manganese ion. The absorbed dosage rate was 1.2 rad/s. The content of sulphurous-acid anhydride in the gas leaving the absorber was 0.0026 vol.%. The degree of purification $\alpha=0.995$. The radiation-chemical yield of the oxidation of sulphurous-acid anhydride $G(-SO_2)$ was 3900 molecules per 100 eV.

What is claimed is:

1. A method of processing waste gases containing sulphurous-acid anhydride comprising the steps of contacting said waste gases with an aqueous solution of sulphuric acid in the presence of a gas selected from the group consisting of oxygen and air and a catalyst selected from the group of inorganic manganese salts consisting of manganese sulphate, manganese perchlorate, manganese chloride, manganese nitrate and manganese phosphate used in an amount of 0.0003–0.03 wt.% based on manganese ion to obtain an aqueous solution of sulphuric acid containing sulphurous-acid anhydride, subjecting the resulting solution to the action of ionizing radiation for initiating the oxidation of sulphurous-acid anhydride to obtain an aqueous solution of sulphuric acid substantially free of sulphurous-acid anhydride, removing a part of the sulphuric acid in the form of the resulting solution in an amount equivalent to the amount of the oxidized sulphurous-acid anhydride, and feeding the remaining part of the aqueous solution of sulphuric acid for contacting with said waste gases.

2. A method according to claim 1, wherein the remaining part of the aqueous solution of sulphuric acid is mixed with an aqueous solution of the catalyst prior to contacting with said waste gases.

3. A method according to claim 1, wherein the waste gases are mixed with a gas selected from the group consisting of oxygen and air prior to contacting with said aqueous solution of sulphuric acid.

4. A method according to claim 1, wherein the waste gases are contacted with the aqueous solution of sulphuric acid with concurrent feeding of a gas selected from the group consisting of oxygen and air to the contacting stage.

5. A method according to claim 1, wherein the aqueous solution of sulphuric acid containing sulphurous-acid anhydride is subjected to the action of the ionizing radiation with concurrent feeding of a gas selected from the group consisting of oxygen and air.

6. A method according to claim 1, wherein said waste gases contain up to 0.4 volume % of said sulphurous-acid anhydride.

7. A method according to claim 1, wherein said sulphuric acid in the form of the resulting solution which is removed has a concentration of up to 50%.

8. A method according to claim 1, wherein said ionizing radiation is about 2–70 rad/s.

9. A method according to claim 1, wherein said sulphurous-acid anhydride is converted into sulphuric acid at a yield up to 4000 molecules per 100eV of absorbed radiation.

10. A method according to claim 1, wherein said ionizing radiation is derived from an X-ray, $\gamma$-ray or charged particle accelerator source.

11. A method according to claim 1, wherein said waste gases contacted with said aqueous solution of sulphuric acid are at a temperature up to 70°C.

12. A method according to claim 1, wherein said waste gases contacted with said aqueous solution of sulphuric acid are at a temperature of 20°–90°C.

13. A method of processing waste gases containing sulphurous-acid anhydride comprising the steps of absorbing said waste gases with an irradiated aqueous solution of sulphuric acid in the presence of oxygen and a catalyst selected from the group consisting of inorganic manganese salts in an amount of 0.0003–0.03 wt.% based on manganese ion to obtain an aqueous solution of sulphuric acid containing sulphurous-acid anhydride, subjecting the resulting solution to the action of ionizing radiation for initiating the oxidation of sulphurous-acid anhydride to obtain an irradiated aqueous solution of sulphuric acid substantially free of sulphurous-acid anhydride recovering a part of the sulphuric acid in the form of the resulting solution in an amount equivalent to the amount of the oxidized sulphurous-acid anhydride, and using the remaining part of the irradiated aqueous solution of sulphuric acid for absorbing said waste gases.

* * * * *